(12) United States Patent
Lai et al.

(10) Patent No.: US 8,952,305 B2
(45) Date of Patent: Feb. 10, 2015

(54) AUTOFOCUS SYSTEM AND AUTOFOCUS METHOD

(71) Applicant: Industrial Technology Research Institute, Hsinchu (TW)

(72) Inventors: Huang-Wen Lai, New Taipei (TW); Shih-Hsuan Kuo, Hsinchu County (TW); Leh-Rong Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 198 days.

(21) Appl. No.: 13/784,640

(22) Filed: Mar. 4, 2013

(65) Prior Publication Data

US 2014/0092295 A1 Apr. 3, 2014

(30) Foreign Application Priority Data

Oct. 1, 2012 (TW) .............................. 101136168 A (51) Int. Cl.
*G03B 13/36* (2006.01)
*G02B 7/38* (2006.01)

(52) U.S. Cl.
CPC . *G03B 13/36* (2013.01); *G02B 7/38* (2013.01)
USPC ...................... 250/201.2; 250/201.4; 356/609

(58) Field of Classification Search
USPC ........ 250/201.2, 201.3, 201.4, 201.5, 559.01, 250/559.29; 356/609, 624, 237.2, 237.3; 348/345
See application file for complete search history.

(56) References Cited

U.S. PATENT DOCUMENTS

| 5,785,651 | A | 7/1998 | Kuhn et al. |
| 6,580,502 | B1 | 6/2003 | Kuwabara |
| 6,674,572 | B1 | 1/2004 | Scheruebl et al. |
| 7,477,401 | B2 | 1/2009 | Marx et al. |
| 8,830,458 | B2 * | 9/2014 | Shyu et al. ................. 356/237.6 |
| 2003/0103662 | A1 | 6/2003 | Finkbeiner |
| 2006/0109483 | A1 | 5/2006 | Marx et al. |

(Continued)

FOREIGN PATENT DOCUMENTS

| TW | 200501135 | 1/2005 |
| TW | 200513672 | 4/2005 |

(Continued)

OTHER PUBLICATIONS

Joseph Cohen-Sabban et al., "Extended Field Confocal Imaging for 3D Surface Sensing", Proceedings of SPIE, Feb. 2004, pp. 366-371, vol. 5252, SPIE, US.

(Continued)

*Primary Examiner* — Kevin Pyo (57) ABSTRACT

An embodiment of an autofocus system is provided, including a height detection module, an image detection module, a movement unit and a processing unit. The height detection module is arranged to output a plurality of detection lights along a Z axis direction, wherein each of the detection lights has different focal lengths and different wavelengths such that the height detection module generates a dispersion region along the Z axis direction. The image detection module is arranged to capture an image of the focus position. The movement unit is arranged to move an object along the Z axis direction, wherein the object has an internal surface and an external surface. The processing unit determines whether the external surface and the internal surface are within the dispersion region according to the quantity of the energy peaks of a reflectance spectrum received by the height detection module.

11 Claims, 7 Drawing Sheets

(56) References Cited

U.S. PATENT DOCUMENTS

2011/0157458 A1 6/2011 Chen et al.
2011/0193269 A1 8/2011 Ito et al.
2012/0026592 A1 2/2012 Reininger

FOREIGN PATENT DOCUMENTS

| TW | 200730868 | 8/2007 |
|---|---|---|
| TW | 201017211 | 5/2010 |
| TW | 201031944 | 9/2010 |
| TW | 201104284 | 2/2011 |
| TW | 201122700 | 7/2011 |

OTHER PUBLICATIONS

J. Schwider et al., "Dispersive Interferometric Profilometer", Optics Letters, Jul. 1994, pp. 995-997, vol. 19, No. 13, Optical Society of America, US.

H. J. Tiziani et al., "Three-Dimensional mage Sensing by Chromatic Confocal Microscopy", Applied Optics, Apr. 1994, pp. 1838-1843, vol. 33, No. 10, Optical Society of America, US.

Sarah L. Dobson et al., "Diffractive Lenses for Chromatic Confocal Imaging", Applied Optics, Jul. 1997, pp. 4744-4748, vol. 36, No. 20, Optical Society of America, US.

Paul C. Lin et al., "Single-Shot Depth-Section Imaging Through Chromatic Slit-Scan Confocal Microscopy", Applied Optics, Oct. 1998, pp. 6764-6770, vol. 37, No. 28, Optical Society of America, US.

Aiko K. Ruprecht et al., "Chromatic Confocal Detection for High Speed Micro-Topography Measurements", Three-Dimensional Image Capture and Applications VI. Proceedings of SPIE, Apr. 2004, pp. 53-60, vol. 5302, SPIE, US.

Taiwan Patent Office, Office Action, U.S. Appl. No. 10/136,168, Apr. 22, 2014, Taiwan.

* cited by examiner

AUTOFOCUS SYSTEM AND AUTOFOCUS METHOD

CROSS REFERENCE TO RELATED APPLICATIONS

This Application claims priority of Taiwan Patent Application No. 101136168, filed on Oct. 1, 2012, the entirety of which is incorporated by reference herein.

BACKGROUND

1. Technical Field

The present disclosure relates to a measurement system of images, and in particular, relates to an autofocus system.

2. Description of the Related Art

Industrial products have become more various due to industrial improvement. Thus, in order not to affect the production speed, the manufacturing speed and the measurement speed have to be improved. However, due to the increased size of products and bad uniformity of the characteristics of an object and the measurement apparatus, the object departs from the range of the depth of field of the inspection module. Thus, re-focusing is needed to continue the measurement. However, re-focusing decreases the production speed.

Therefore, an autofocus system and an autofocus method for measuring the images of the surface of an object are needed.

SUMMARY

An embodiment of an autofocus system is provided, wherein the autofocus system comprises a height detection module, an image detection module, a movement unit and a processing unit. The height detection module is arranged to output a plurality of detection lights along a Z axis direction, wherein each of the detection lights has different focal lengths and different wavelengths so that the height detection module generates a dispersion region along the Z axis direction. The image detection module is arranged to capture an image of the focus position. The movement unit is arranged to move an object along the Z axis direction, wherein the object has an internal surface and an external surface. The processing unit determines whether the external surface and the internal surface are within the dispersion region according to a quantity of the energy peaks of a reflectance spectrum received by the height detection module, wherein when the external surface and the internal surface are within the dispersion region, the processing unit calculates an actual distance between the internal surface and the focus position, so that the processing unit moves the internal surface to the focus position by the movement unit in accordance with the actual distance.

An embodiment of an autofocus method is provided, wherein the autofocus method comprises outputting a plurality of detection lights along a Z axis direction by a height detection module, wherein each of the detection lights has different focal lengths and wavelengths, so that the height detection module generates a dispersion region at the Z axis direction, determining whether an external surface and an internal surface of an object are both within the dispersion region by a processing unit according to a quantity of the energy peaks of a reflectance spectrum received by the height detection module, when the external surface and the internal surface are both within the dispersion region, calculating an actual distance between the internal surface and a focus position of an image detection module according to the reflectance wavelengths in correspondence with the energy peaks, and moving the internal surface to the focus position by a movement unit in accordance with the actual distance.

A detailed description is given in the following embodiments with reference to the accompanying drawings.

BRIEF DESCRIPTION OF DRAWINGS

The present disclosure can be more fully understood by reading the subsequent detailed description and examples with references made to the accompanying drawings, wherein.

DETAILED DESCRIPTION

The following description is of the best-contemplated mode of carrying out the embodiment. This description is made for the purpose of illustrating the general principles of the embodiment and should not be taken in a limiting sense. The scope of the embodiment is best determined by reference to the appended claims.

Figure 1:
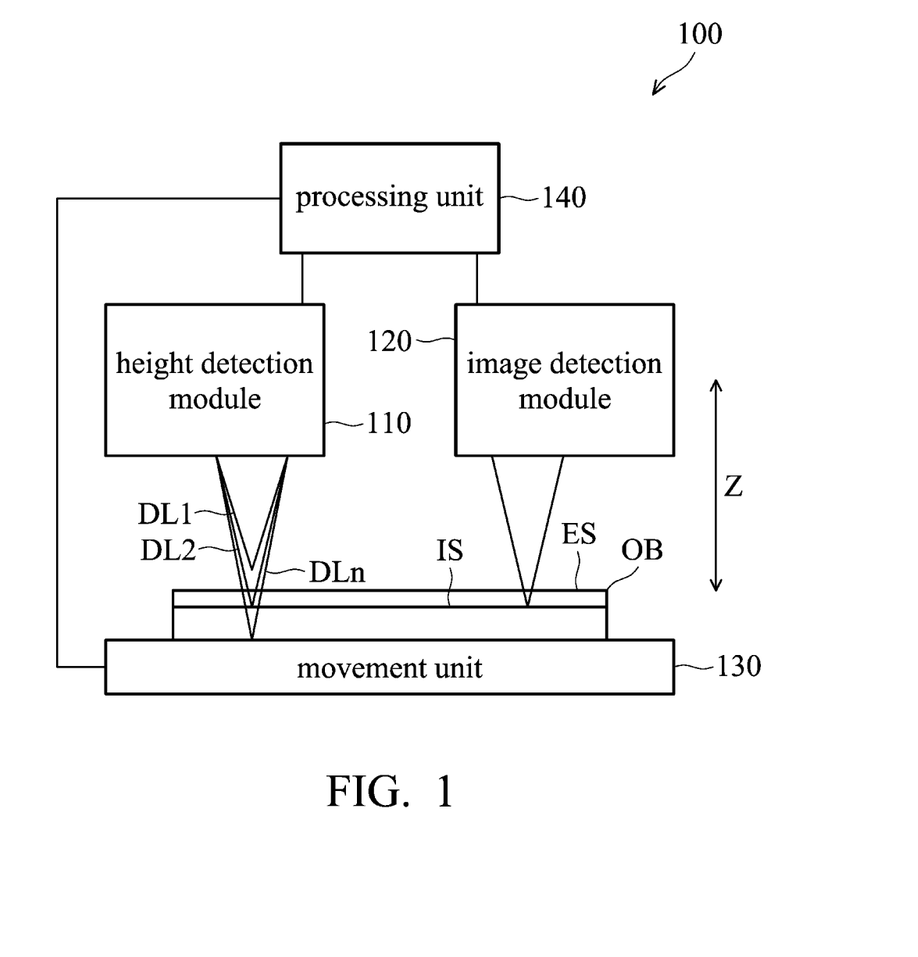
FIG. 1 is a schematic diagram of the autofocus system in accordance with an exemplary embodiment.

FIG. 1 is a schematic diagram of the autofocus system in accordance with an exemplary embodiment. Referring to FIG. 1, the autofocus system is arranged to automatically focus the internal surface IS of the object OB. Specifically, the external layer of the object OB is a transparent layer or a semi-transparent layer. Therefore, the object OB has an external surface ES and an internal surface IS. The autofocus system 100 includes a height detection module 110, an image detection module 120, a movement unit 130 and a processing unit 140. Specifically, the height detection module 110 is arranged to output a plurality of detection lights DL1~DLn along the Z axis direction Z, in which each of the detection lights DL1~DLn has different focal lengths and different wavelengths. Thus, the height detection module 110 generates a dispersion region (shown as the dispersion region DA in FIG. 2) along the Z axis direction Z. For example, the wavelength and the focal length of the detection light DL1 are 350 nm and 10 cm, respectively. The wavelength and the focal length of the detection light DL2 are 400 nm and 10.1 cm, respectively. The wavelength and the focal length of the detection light DLn are 800 nm and 12 cm, respectively. The wavelength and the focal length are arranged for illustration, but the embodiment is not limited thereto.

The image detection module 120 is arranged to capture an image of the focus position. For example, when the focus position is 10 cm and the distance between the object OB and the image detection module 120 is 10 cm, the image detection module 120 obtains a clear image of the object OB. The movement unit 130 can move the object OB along the Z axis direction Z, such that the object OB is moved to the focus position of the image detection module 120. In some embodiments, the movement unit 130 can be moved along the X axis direction and/or the Y axis direction. In some embodiments, the movement unit 130 can move the height detection module 110 and the image detection module 120. The processing unit 140 determines whether the external surface ES and the internal surface IS are both within the dispersion region according to the quantity of the energy peaks of the reflectance spectrum received by the height detection module 110. When the external surface ES and the internal surface IS are both within the dispersion region, the processing unit 140 calculates the actual distance between the internal surface IS of the object OB and the focus position of the image detection module 120, such that the processing unit 140 moves the internal surface IS of the object OB to the focus position (shown as the focus position FP in FIG. 2) by the movement unit 130 in accordance with the actual distance.

Figure 2:
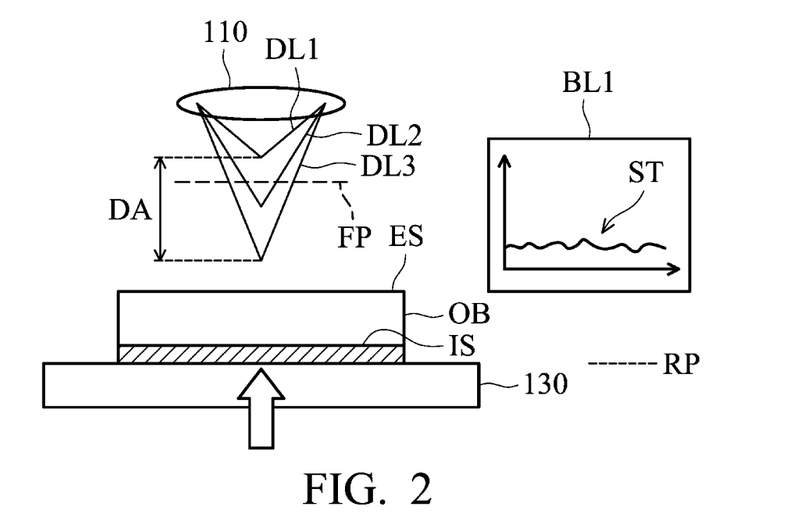
FIG. 2 is a schematic diagram of an object and a dispersion region in accordance with an exemplary embodiment.

FIG. 2 is a schematic diagram of the object OB and the dispersion region DA in accordance with an exemplary embodiment, wherein the object OB is not within the dispersion region DA. Referring to FIG. 2, because the focal lengths of the detection lights DL1, DL2 and DL3 are different, the dispersion region DA is generated by the height detection module 110 on the Z axis direction Z. Because the object OB has not entered into the dispersion region DA, there is no energy peak in the reflectance spectrum ST (in the block BL1) of the height detection module 110. The processing unit 140 determines that both the external surface ES and the internal surface IS of the object OB have not entered into the dispersion region DA due to no energy peak, and the processing unit 140 controls the movement unit 130 to move the object 130 along the Z axis direction Z.

Figure 3:
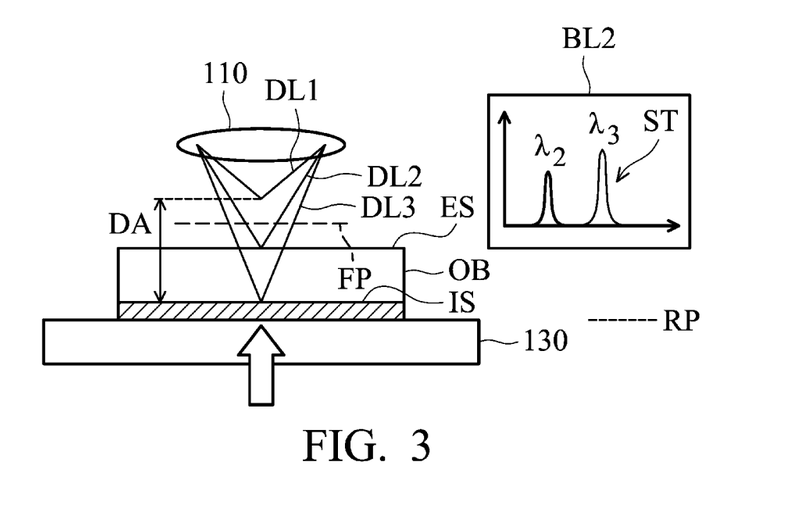
FIG. 3 is a schematic diagram of an object and a dispersion region in accordance with another exemplary embodiment.

FIG. 3 is a schematic diagram of the object OB and the dispersion region DA in accordance with another exemplary embodiment, wherein the object OB enters into the dispersion region DA. Referring to FIG. 3, when the object OB is within the dispersion region DA, the external surface ES and the internal surface IS of the object OB accordingly reflect the detected lights to the height detection module 110. For example, the internal surface IS is at the focus of the detection light DL3. Thus, the internal surface reflects the detection light DL3 having the wavelength $\lambda_3$ to the height detection module 110. The external surface ES is at the focus of the detection light DL2. Thus, the external surface reflects the detection light DL2 having the wavelength $\lambda_2$ to the height detection module 110.

Therefore, there are two energy peaks in accordance with the wavelength $\lambda_2$ and $\lambda_3$ at the reflectance spectrum (in the block BL2) of the height detection module 110. The processing unit 140 determines that both the external surface ES and the internal surface IS of the object OB have entered the dispersion region DA due to the quantity of the energy peaks. Therefore, the processing unit 140 stops moving the object OB by the movement unit 130. Specifically, when there is one energy peak on the reflectance spectrum, the processing unit 140 determines that either the external surface ES or the internal surface IS is within the dispersion region DA.

Figure 4:
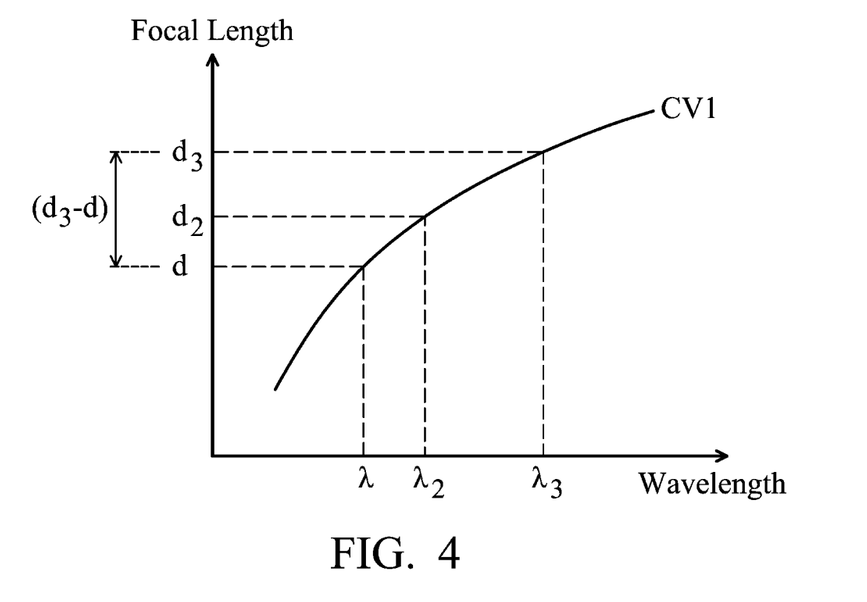
FIG. 4 is a schematic diagram of the relationship between the wavelength and the focal length in accordance with an exemplary embodiment.

FIG. 4 is a schematic diagram of the relationship between the wavelength and the focal length in accordance with an exemplary embodiment. Referring to FIG. 4, the horizontal axis is the wavelength, and the vertical axis is the focal length. The processing unit 140 obtains the focal lengths of the wavelengths $\lambda_2$ and $\lambda_3$ according to the correction curve CV1, in which the maximum of the focal length (such as the focal length $d_3$ of the wavelength $\lambda_3$) is the distance between the internal surface IS and the height detection module 110, and the minimum of the focal length (such as the focal length $d_2$ of the wavelength $\lambda_2$) is the distance between the external surface ES and the height detection module 110. Therefore, the difference between the focal length d (the focus position) and the focal length $d_3$ of the image detection module 120 is the actual distance ($d_3$–d) between the object OB and the focus position. Specifically, the correction curve CV1 can be stored in the processing unit 140, or within any other storage device.

Figure 5:
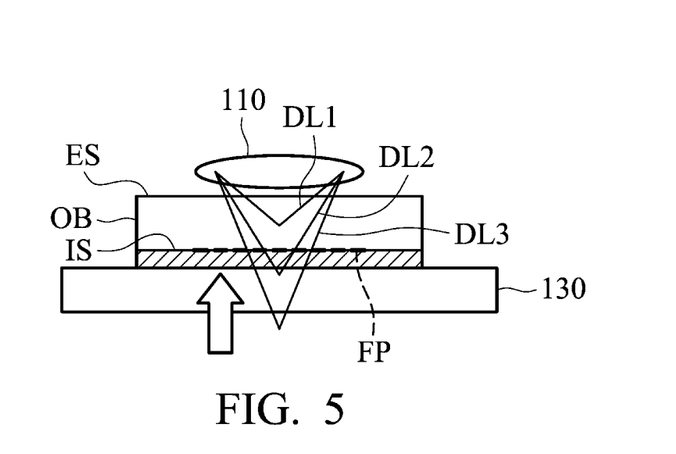
FIG. 5 is a schematic diagram of an object and a dispersion region in accordance with another exemplary embodiment.

FIG. 5 is a schematic diagram of the object OB and the dispersion region DA in accordance with another exemplary embodiment. Referring to FIG. 5, the processing unit 140 moves the object OB to the focus position FP by the movement unit 130 in accordance with the actual distance ($d_3$–d). Specifically, the movement unit 130 moves the length of ($d_3$–d) along the Z axis direction Z. Thus, the focus position FP overlaps with the internal surface IS, such that the image detection module 120 obtains a clear image of the internal surface IS of the object OB.

Figure 6:
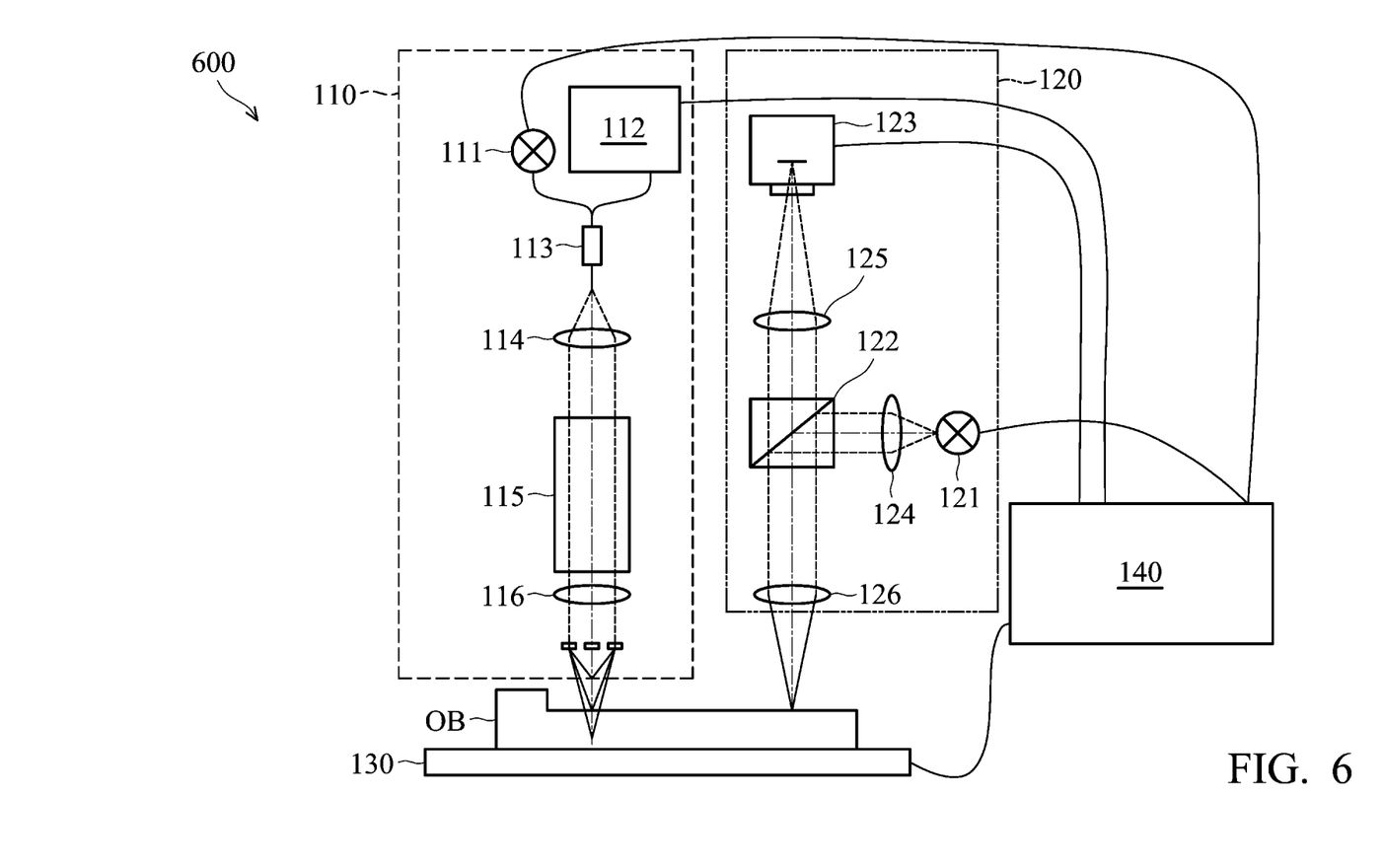
FIG. 6 is a schematic diagram of the autofocus system in accordance with an exemplary embodiment.

FIG. 6 is a schematic diagram of the autofocus system in accordance with an exemplary embodiment. Referring to FIG. 6, the height detection module 110 includes a first light source generation unit 111, a spectrum detection module 112, a fiber coupling unit 113, a first alignment unit 114, a dispersion unit 115 and a first focus unit 116. Specifically, The first light source generation unit 111 is arranged to output the received broadband light. The spectrum detection module 112 is arranged to obtain the reflectance spectrum of the object OB. The fiber coupling unit 113 has a first terminal coupled to the first light source generation unit 111, a second terminal coupled to the spectrum detection module 112, and a third terminal arranged to output the broadband light. The first alignment unit 114 is arranged to align the broadband light outputted by the fiber coupling unit 113. The dispersion unit 115 is arranged to disperse the broadband light outputted by the first alignment unit 114 into a plurality of detection lights DL1~DLn. The first focus unit 116 is arranged to focus the detection lights DL1~DLn on the corresponding focal length.

In addition, the image detection module 120 includes a second light source generation unit 121, a second alignment unit 124, a first light division unit 122, an image capture unit 123, an image formation lens set 125 and a second focus unit 126. Specifically, the second light source generation unit 121 is arranged to generate a broadband light. Specifically, the broadband light generated by the first light source generation unit 111 is the same or different from the broadband light generated by the second light source generation unit 121. The first light source generation unit 111 and the second light source generation unit 121 can be controlled by the processing unit 140.

The second alignment unit 124 is arranged to align the broadband light outputted by the second light source generation unit 121. The first light division unit 122 is arranged to reflect the broadband light outputted by the second alignment unit 124. The image capture unit 123 is arranged to receive the reflectance light from the focus position FP in order to obtain the image of the focus position FP. The image formation lens set 125 is placed between the image capture unit 123 and the first light division unit 122. The image formation lens set 125 is arranged to form the image of the reflectance light on the image capture unit 123, wherein the image of the reflectance light is transmitted from the focus position FP. The second focus unit 126 is arranged to focus the broadband light outputted by the first light division module 122 at the focus position FP. Referring to FIG. 6, the detection points of the height detection module 110 and the image detection module 120 are different. However, in some exemplary embodiments, the detection points of the height detection module 110 and the image detection module 120 are the same.

Figure 7:
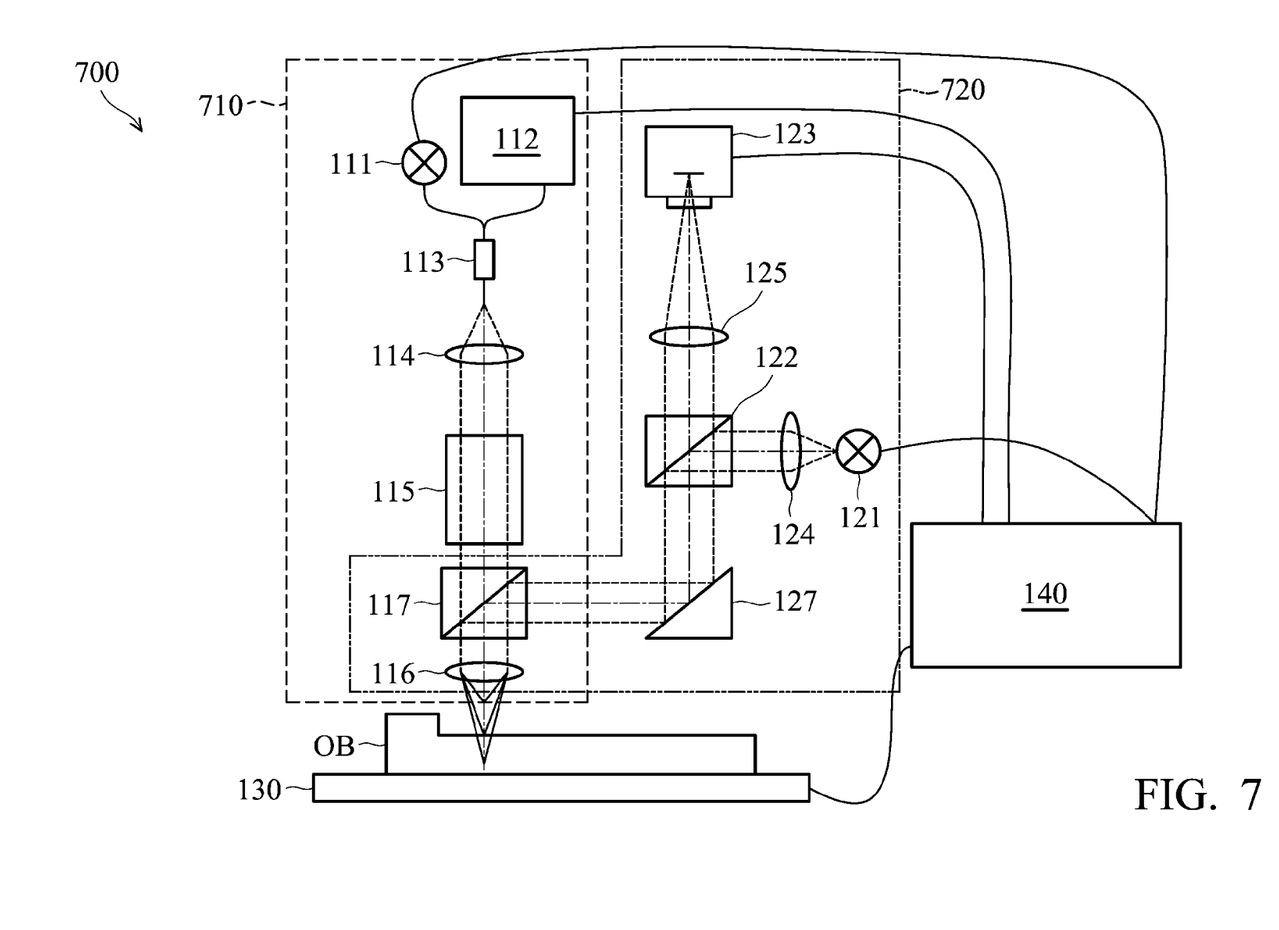
FIG. 7 is a schematic diagram of the autofocus system in accordance with another exemplary embodiment.

FIG. 7 is a schematic diagram of the autofocus system in accordance with another exemplary embodiment. The autofocus system in FIG. 7 is similar to that in FIG. 6, but it is different in that the autofocus system 700 is a common optical path system. Accordingly, the autofocus system 700 does not have the focus unit 126, and the detection points of the height detection module 710 and the image detection module 720 are the same. The height detection module 710 includes the second light division unit 117 placed between the dispersion unit 115 and the first focus unit 116. The image detection module 720 includes a reflectance mirror 127 placed between the first light division unit 122 and the second light division unit 117. Therefore, the lights of the height detection module 710 and the image detection module 720 both pass through the first focus unit 116.

Figure 8:
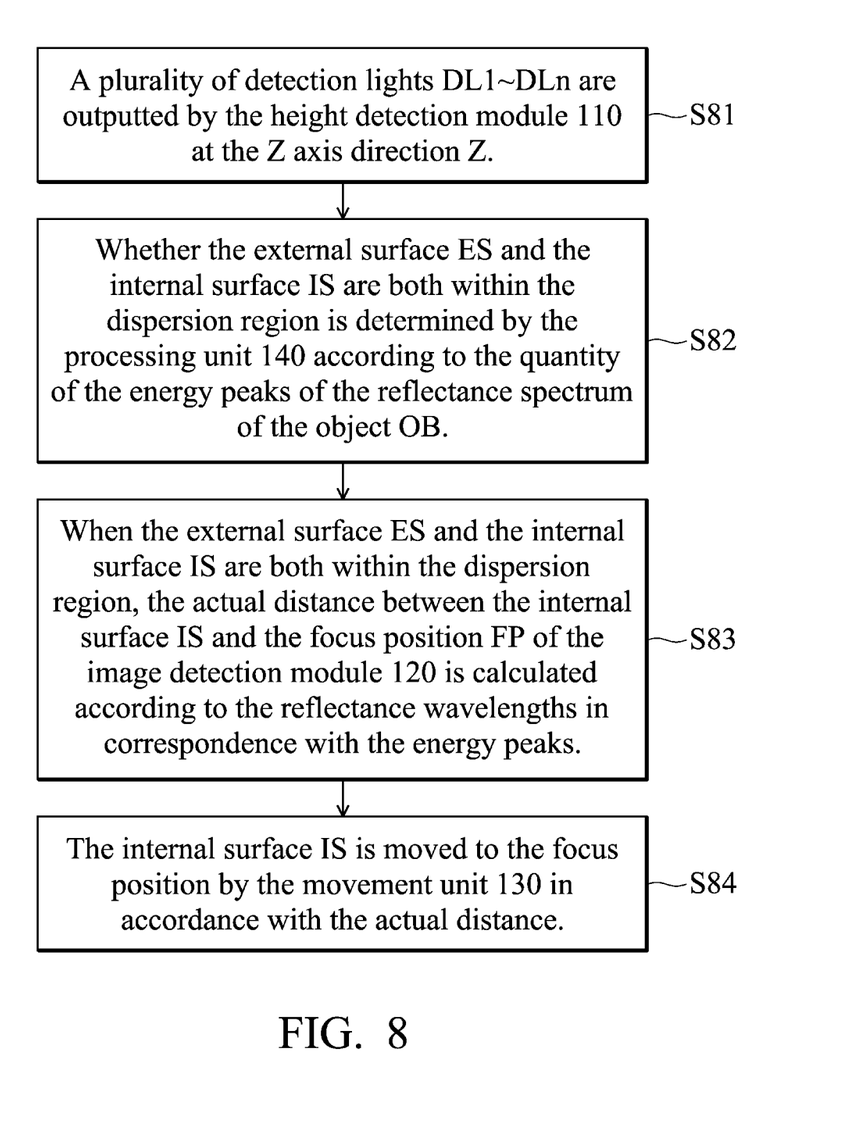
FIG. 8 is a flowchart of an autofocus method in accordance with an exemplary embodiment.

FIG. 8 is a flowchart of an autofocus method in accordance with an exemplary embodiment. Referring to FIG. 8, the autofocus method includes the following steps.

In step S81, a plurality of detection lights DL1~DLn are outputted by the height detection module 110 at the Z axis direction Z. Each of the detection lights DL1~DLn has different focal lengths and different wavelengths, such that the height detection module 110 generates a dispersion region DA at the Z axis direction Z. In step S82, whether the external surface ES and the internal surface IS are both within the dispersion region is determined by the processing unit 140 according to the quantity of the energy peaks of the reflectance spectrum of the object OB. In step S83, when the external surface ES and the internal surface IS are both within the dispersion region, the actual distance (such as $(d_3-d)$ of FIG. 4) between the internal surface IS and the focus position FP of the image detection module 120 is calculated according to the reflectance wavelengths in correspondence with the energy peaks. In step S84, the processing unit 140 moves the internal surface IS to the focus position by the movement unit 130 in accordance with the actual distance.

Figure 9:
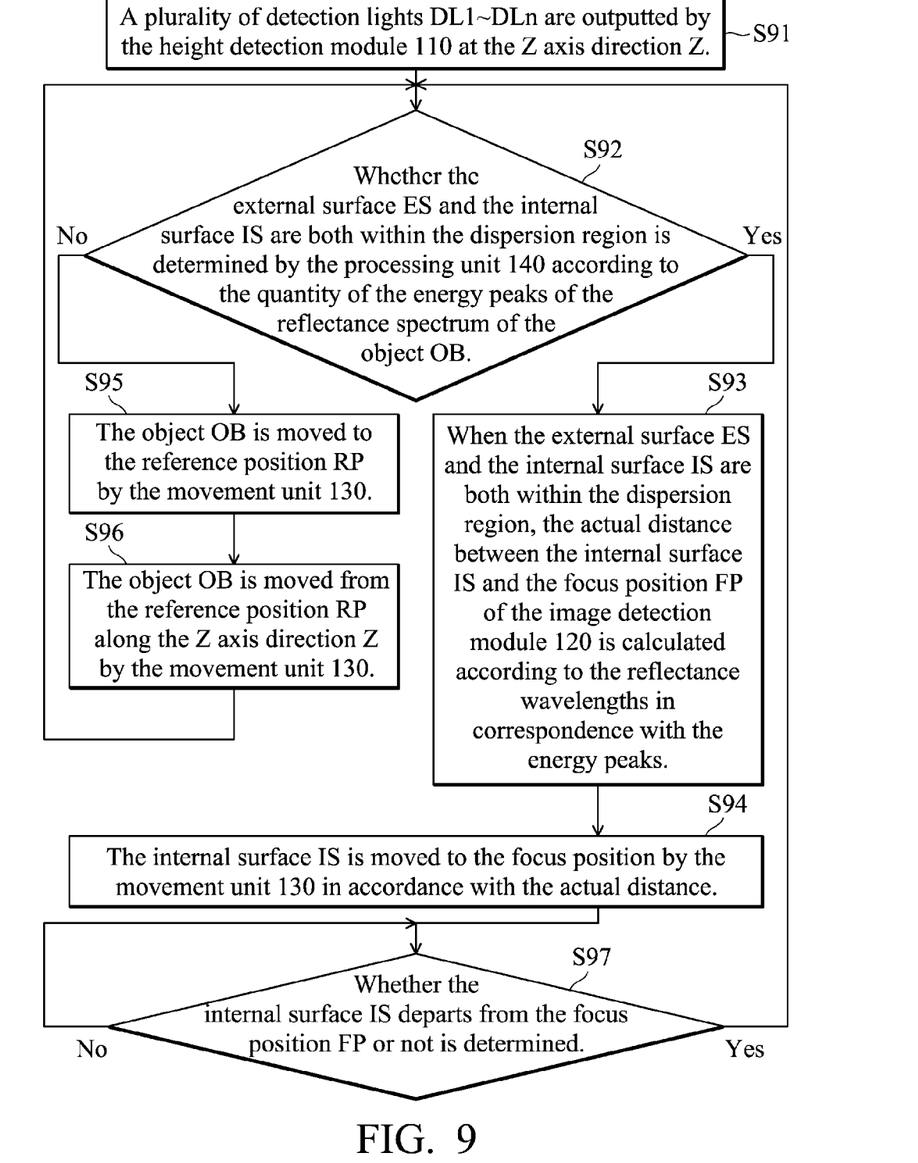
FIG. 9 is a flowchart of an autofocus method in accordance with another exemplary embodiment.

FIG. 9 is a flowchart of an autofocus method in accordance with another exemplary embodiment, wherein the steps S91~S94 are the same as the steps S81~S84. When the external surface ES and the internal surface IS are not within the dispersion region DA, then step S95 is performed. In step S95, the object OB is moved to the reference position RP by the movement unit 130. In step S96, the object OB is moved from the reference position RP along the Z axis direction Z by the movement unit 130. Then, step S92 is performed. In step S97, whether the internal surface IS departs from the focus position FP is determined. If yes, then step S92 is performed. If not, step S97 is performed until the end of the procedure of the image detection.

Because the height detection module 110 of the exemplary embodiment immediately detects the position of the internal surface IS, the processing unit 140 controls the movement unit 130 according to the position information of the internal surface IS, such that the internal surface IS of the object OB is kept at the focus position FP. Therefore, the autofocus system of the exemplary embodiment can be utilized in the measurement of the large-size substrate.

While the embodiment has been described by way of example and in terms of the preferred embodiments, it is to be understood that the embodiment is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An autofocus system, comprising:
   a height detection module, arranged to output a plurality of detection lights along a Z axis direction, wherein each of the detection lights has different focal lengths and different wavelengths, such that the height detection module generates a dispersion region along the Z axis direction;
   an image detection module, arranged to capture an image of a focus position;
   a movement unit, arranged to move an object along the Z axis direction, wherein the object has an internal surface and an external surface; and
   a processing unit, arranged to determine whether the external surface and the internal surface are within the dispersion region according to a quantity of the energy peaks of a reflectance spectrum received by the height detection module, such that the processing unit calculates an actual distance between the internal surface and the focus position when the external surface and the internal surface are within the dispersion region, thereby the processing unit moves the internal surface to the focus position by the movement unit in accordance with the actual distance.

2. The autofocus system as claimed in claim 1, wherein the height detection module comprises:
   a first light source generation unit, arranged to output a first broadband light;
   a spectrum detection module, arranged to obtain the reflectance spectrum of the object;
   a fiber coupling unit, having a first terminal coupled to the first light source generation unit, a second terminal coupled to the spectrum detection module, and a third terminal arranged to output the received first broadband light;
   a first alignment unit, arranged to align the first broadband light outputted by the fiber coupling unit;
   a dispersion unit, arranged to disperse the first broadband light outputted by the first alignment unit into the plurality of detection lights; and
   a first focus unit, arranged to focus the plurality of detection lights on the corresponding focal lengths.

3. The autofocus system as claimed in claim 2, wherein the image detection module comprises:
   a second light source generation unit, arranged to provide a second broadband light;
   a second alignment unit, arranged to align the second broadband light outputted by the second light source generation unit;
   a first light division unit, arranged to reflect the second broadband light outputted by the second alignment unit;
   an image capture unit, arranged to receive a reflectance light from the focus position thereby obtaining the image of the focus position; and
   an image formation lens set, placed between the image capture unit and the first light division unit, and arranged to form an image of the reflectance light on the image capture unit, wherein the image of the reflectance light is transmitted from the focus position.

4. The autofocus system as claimed in claim 3, wherein the height detection module further comprises a second light division unit placed between the dispersion unit and the first focus unit, and the image detection module further comprises a reflectance lens placed between the first light division unit and the second light division unit, such that the optical paths of the height detection module and the image detection module both pass through the first focus unit.

5. The autofocus system as claimed in claim 3, wherein the image detection module further comprises a second focus unit arranged to focus the second broadband light outputted by the first light division module to the focus position.

6. The autofocus system as claimed in claim 1, wherein the movement unit further moves the object along an X axis direction and a Y axis direction.

7. The autofocus system as claimed in claim 1, wherein when the quantity of the energy peaks of the reflectance spectrum equals to one, the processing unit determines that either the external surface or the internal surface is within the dispersion region, and when the quantity of the energy peaks of the reflectance spectrum is equal to or larger than two, the processing unit determines that the external surface and the internal surface are both within the dispersion region.

8. An autofocus method, utilized on an autofocus system, the autofocus method comprising:
   outputting a plurality of detection lights along a Z axis direction by a height detection module, wherein each of the detection lights has different focal lengths and wavelengths, such that the height detection module generates a dispersion region at the Z axis direction;
   determining whether an external surface and an internal surface of an object are both within the dispersion region by a processing unit according to a quantity of the energy peaks of a reflectance spectrum received by the height detection module;
   calculating an actual distance between the internal surface and a focus position of an image detection module according to reflectance wavelengths in correspondence with the energy peaks, when the external surface and the internal surface are both within the dispersion region; and
   moving the internal surface to the focus position by a movement unit in accordance with the actual distance.

9. The autofocus method as claimed in claim 8, further comprising:
   moving the object to a reference position by the movement unit, when both of the external surface and the internal surface are not within the dispersion region; and
   moving the object by the movement unit from the reference position along the Z axis direction until both of the internal surface and the external surface enter into the dispersion region.

10. The autofocus method as claimed in claim 8, wherein when the quantity of the energy peaks of the reflectance spectrum equals to one, determining that either the external surface or the internal surface is within the dispersion region, and when the quantity of the energy peaks of the reflectance spectrum is equal or larger than two, determining that both of the external surface and the internal surface are within the dispersion region.

11. The autofocus method as claimed in claim 8, further comprising:
   dispersing a broadband light into the plurality of detection lights by a dispersion unit of the height detection module.

* * * * *